United States Patent Office 3,400,171
Patented Sept. 3, 1968

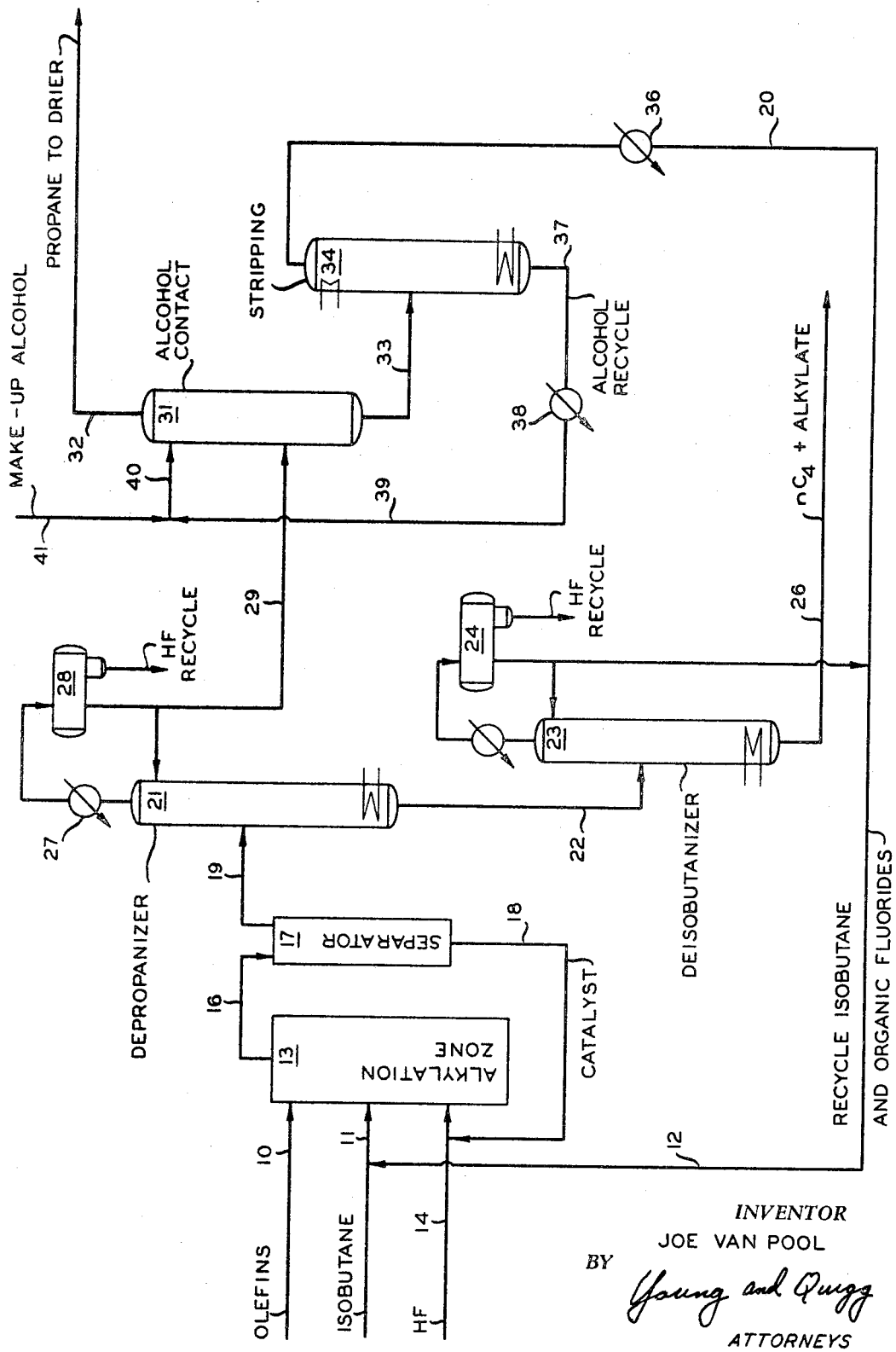

3,400,171
RECOVERY OF ORGANIC FLUORIDES
Joe Van Pool, Bartlesville, Okla., assignor to Phillips
Petroleum Company, a corporation of Delaware
Filed Jan. 6, 1966, Ser. No. 519,049
9 Claims. (Cl. 260—683.42)

ABSTRACT OF THE DISCLOSURE

Removal of organic fluorides from hydrocarbon streams containing same by extraction with an alcohol immiscible with hydrocarbons. Alcohols which can be used for this purpose include methyl, ethyl, isopropyl and normal propyl alcohol. The organic fluorides may be separated from the alcohol and recycled to the alkylation reaction as an alkylating agent.

---

This invention relates to a method of removing organic fluorides from a stream containing same. In one aspect, it relates to the removal of organic fluorides from a stream by extraction with an alcohol. In another aspect, it relates to removing organic fluorides from a hydrocarbon stream by extraction with alcohol. In another aspect, it relates to a method of treating the effluent stream from an alkylation reaction by extracting organic fluorides therefrom with alcohol. Still another aspect relates to a process of alkylation wherein the organic fluorides formed in the alkylation are removed from the alkylate and/or from lighter hydrocarbons by extraction with alcohol and returned to the alkylation reactor as an alkylating agent. In still another aspect, it relates to a method of removing organic fluorides from a substantially alcohol immiscible stream containing same by contacting said stream with an extractant which consists essentially of an alcohol capable of extracting the fluorides.

The process of my invention will be described more fully in terms of one embodiment wherein the organic fluorides are removed from the light hydrocarbons and/or from the alkylate product formed by an isoparaffin and an olefin reaction in the presence of hydrofluoric acid. While the process of my invention is applicable to any substantially alcohol immiscible product stream containing organic fluorides, it finds its greatest application in treating alkylates and/or light hydrocarbons formed by the well-known process of HF alkylation. Hydrogen fluoride is finding use to an increasing extent as a catalyst in hydrocarbon conversions, especially alkylation of paraffins with olefins to make motor and aviation fuel components of high anti-knock rating. It has also been used as a treating and refining agent for motor and aviation fuels in lubricating oil. The crude hydrocarbon products obtained by such processes contain substantial amounts of organically combined fluorine which must be removed in order to meet certain specifications. Products made with other fluorine-containing catalysts, chief among which is boron trifluoride, likewise contain combined organic fluorine.

Processes of alkylation using fluoride-containing catalysts are well known in the art. In a typical HF alkylation reaction, for example, the alkylation of isobutane with a butene to form isooctane, the reactor effluent is fractionally distilled to remove low boiling hydrocarbons from the alkylate. In those instances where the low boiling hydrocarbons are recycled to the process, the presence therein of organic fluorides poses no problem. However, in those instances wherein the low boiling hydrocarbons are utilized as a product, it is often necessary that these hydrocarbons be substantially free from organic fluorides.

Also, propane and normal butane (which are not alkylated during the alkylation treatment) are recovered from alkylation products and used as fuels or starting materials for various industrial uses such as in the production of hydrogen and olefins. Such recovered lower paraffin fractions are contaminated by organic fluorine compounds formed in the alkylation process, and it is desirable that these organic fluorine compounds be removed from the lower paraffin product streams, because of corrosion caused by the fluorides in the combustion products when used as fuels, and corrosion and/or catalyst contamination when, e.g., the produced olefins are polymerized.

Similar problems of fluorine contamination are existent in other alkylation reactions, such as the alkylation of benzene or other aromatics with any alkylating agent such as olefins and organic fluorides. The process of my invention is suitable not only for the product streams from alkylation reaction, but for any stream which is substantially alcohol immiscible, and which contains organic fluorides.

It is, therefore, an object of my invention to remove organic fluorides from a product stream containing same. It is a further object of my invention to remove organic fluorides from a synthetic hydrocarbon stream formed by alkylation. It is further an object of my invention to treat an alkylation effluent whereby the various product streams are rendered free of organic fluorides. It is a further object of my invention to provide an alkylation process wherein the products of that process are free from organic fluorides.

These and other objects are accomplished by one or more, or other, of the aspects of my invention, which is that organic fluorides are removed from substantially alcohol immiscible streams containing the same by extraction therefrom with an extraction agent consisting essentially of an alcohol capable of extracting the organic fluorides.

A better understanding of the present invention will be obtained upon reference to the accompanying diagrammatic flow sheet illustrating the invention in a preferred embodiment in an HF alkylation process.

Referring now to the drawing, an olefin charge composed essentially by butylenes and some propylene is passed by way of pipe 10 to alkylation zone 13. Fresh isobutane in conduit 11 and recycle isobutane in conduit 12 are also introduced into alkylation zone 13 wherein, under usual alkylation conditions, alkylation occurs. The stream in conduit 12 also contains recycle organic fluorides from conduit 20, as will be described. The organic fluorides and recycle isobutane are preferably mixed with fresh feed prior to the alkylation reaction, as is described and claimed in my application Patent No. 3,253,054, filed Sept. 24, 1963. Hydrofluoric acid catalyst is introduced to the alkylation zone through conduit 14.

Emulsion is removed from the alkylation reactor through conduit 16 and conducted to separator 17 wherein the acid phase and hydrocarbon phase separate. The acid phase is returned to the alkylation zone through conduit 18. The hydrocarbon phase is conducted through conduit 19 to depropanizer 21. The overhead from this fractionator will contain most of the organic fluorides formed in the alkylation reaction and will be subjected to the separation process of my invention. The bottom product from this fractionator is conducted through conduit 22 to deisobutanizer 23. The overhead product from this fractionator is cooled and allowed to separate in accumulator 24 wherein any residual hydrofluoric acid separates and may be returned to the alkylation zone. A portion of the isobutane is returned to the fractionator as reflux, and the remaining portion returned through line 12 to the alkylation zone as described previously. The bottom product of this fractionator contains normal butane and the alkylate, and is taken through line 26 to further fractionation or other processing as desired. If heavy organic fluorides are present in this effluent stream, the stream may be alcohol extracted to remove these heavy fluorides in the same manner as will be discussed in relation to the overhead of the depropanizer.

The overhead product from depropanizer 21 will generally contain a substantial portion of the organic fluorides formed in the alkylation zone. This overhead product is cooled in heat exchanger 27 and taken to separator 28. Any residual hydrofluoric acid separates from the propane in the bottom leg of this separator and may be returned to the alkylation zone as catalyst. Sufficient hydrocarbon phase is returned to the depropanizer for reflux, and the remainder is conducted through line 29 to alcohol contacting zone 31. Following extraction is this zone, the purified propane is taken off through line 32 for subsequent use, and the alcohol containing the organic fluorides is removed through line 33 to reboiled stripper 34. The organic fluorides are taken off in the overhead of this heated stripper, cooled in heat exchanger 36, and returned to the alkylation zone as described above. These organic fluorides will serve as additional alkylating agent.

Purified alcohol from which the organic fluorides have been separated is taken off as a bottom product from stripper 34 through line 37, cooled in heat exchanger 38, and returned to the alcohol contacting zone for reuse through lines 39 and 40. Sufficient make up alcohol may be introduced through line 41 to prevent depletion of alcohol from the process.

Any alcohol which is capable of extracting an organic fluoride from a product stream non-miscible with the alcohol is suitable for use in my invention. Non-limiting examples of alcohols which can be conveniently used are methyl alcohol, ethyl alcohol, isopropyl alcohol and normal propyl alcohol.

Liquid phase extraction of the organic fluorides from the hydrocarbon stream with the alcohol may take place at a temperature between 40° F. and 200° F., with a temperature of 75° F. to 125° F. being preferred. Pressure in the alcohol extraction zone is sufficient to maintain liquid phase.

As in the example above, the product stream may be separated into several fractions prior to alcohol extraction, or the entire stream can be so treated.

Example

A butylenes stream was reacted with isobutane in an alkylation reactor at a temperature of 90° F. and at a pressure sufficient to maintain liquid phase. The alkylation catalyst used herein was hydrofluoric acid of about 90 percent purity (the remainder being acid soluble oils, isobutane and water). The mol ratio of reactants was 1:1. The total isobutane (includes recycle) to olefin ratio was 10:1. The hydrocarbon to catalyst volume ratio was 1:1. The alkylate produced was yielded as 1.75 barrels per barrel each of butylenes and isobutane. The alkylate had a research octane number with 3 cc. TEL of 105.5.

Propane from this reaction was contaminated with organic fluorides of 650 p.p.m. Specifications for LPG (propane) allow no more than 50 p.p.m. organic fluorides (all reported as fluorine).

Feed 29 to tower 31, 100 bbls./hr.:
  Composition:
    Ethane _____ vol. percent__ 0.5
    Propane _____ do____ 99.0
    Isobutane _____ do____ 0.5
    Organic fluorides [1] _____ p.p.m.__ 650

Isopropyl alcohol 40 to tower 31, 10 g.p.m.:
  Composition:
    Isopropyl alcohol _____ vol. percent__ 99.5
    Water _____ do____ 0.5
    Organic fluorides _____ Trace
Product 32, 100 bbls./hr.:
  Composition:
    Ethane _____ vol. percent__ 0.5
    Propane _____ do____ 99.0
    Isobutane _____ do____ 0.5
    Organic fluorides [1] _____ p.p.m.__ 40

[1] Primarily isopropyl fluoride, reported as fluorine parts per million.

The volume ratio of alcohol to hydrocarbon containing up to 1000 p.p.m. organic fluorides can be 0.05:1 to 2:1.

| Operating conditions | Preferred range | Specific |
| --- | --- | --- |
| Tower (31): Temperature, ° F. (pressure to maintain liquid phase) | 75–125 | 90 |
| Stripping zone (34): Temperature (top), ° F. | 190–245 | 220 |
| Pressure, p.s.i.g. | 5–30 | 15 |

Although not shown in the drawing, propane product 32 can be passed to a drying zone, such as a bed of bauxite, wherein the alcohol contained in the propane is removed by the adsorbent, allowing the alcohol-free propane to be recovered. Two or more beds of bauxite can be used, one on stream for removal of alcohol from the propane and another on regeneration cycle. Regeneration is effected by using a portion of the propane heated to about 300° F. to 500° F., and the heated vapor is passed through the bed to remove adsorbed alcohol therefrom. The effluent from regeneration is cooled and condensed and charged to a phase separator. Separated alcohol is recycled to contact zone 31, and the propane can be reused as the bauxite regeneration fluid, above-described. In case there is too much water build-up in the recovered alcohol, the alcohol stream can be contacted with a desiccant, such as calcium sulfate, prior to returning the alcohol to zone 31.

Reasonable variation and modification are possible within the scope of the foregoing disclosure, the drawing and the appended claims to the invention, the essence of which is organic fluorides are removed from a substantially alcohol immiscible stream containing same by contacting said stream with an extracting agent consisting essentially of an alcohol capable of extracting the said fluorides.

I claim:
1. A process for removing organic fluorides from a hydrocarbon stream containing same comprising contacting said stream with an extractant consisting essentially of an alcohol substantially immiscible with hydrocarbons an dcapable of extracting said fluorides.

2. The process of claim 1 wherein the alcohol is selected from the group consisting of methyl alcohol, ethyl alcohol, isopropyl alcohol and normal propyl alcohol.

3. The process of claim 1 wherein the hydrocarbon stream is the effluent from an alkylation reactor.

4. The process of claim 3 wherein said organic fluorides are removed from said alcohol and returned to said reactor as an alkylating agent.

5. The process of claim 1 wherein the hydrocarbon stream is the effluent from a paraffin-olefin alkylation reactor.

6. The process of claim 5 wherein said paraffin is isobutane, said olefin is a butylenes mixture and said alcohol is isopropyl alcohol.

7. The process of claim 6 wherein said paraffin is isobutane, said olefin is a mixture of propylene and butylenes, and said alcohol is normal propyl alcohol.

8. A process for treating a fluoride containing alkylate stream comprising contacting said stream under extracting conditions with an extractant consisting essentially of an alcohol substantially immiscible with said alkylate and capable of extracting organic fluorides from said stream, separating extracted organic fluorides from said alcohol, and recycling separated organic fluorides to the alkylation reaction as an alkylating agent.

9. A process according to claim 8 wherein the alcohol is selected from the group consisting of methyl alcohol, ethyl alcohol, isopropyl alcohol and normal propyl alcohol, and said alkylation reaction employs HF catalyst.

References Cited

UNITED STATES PATENTS

| 2,386,798 | 10/1945 | Hughes | 208—262 |
| 2,409,372 | 10/1946 | Matuszak | 208—262 |
| 2,472,908 | 6/1949 | Linn | 260—683.42 |

DELBERT E. GANTZ, *Primary Examiner.*

G. J. CRASANAKIS, *Assistant Examiner.*